United States Patent
Chang

(10) Patent No.: US 11,698,139 B2
(45) Date of Patent: Jul. 11, 2023

(54) FLUID TRANSFER GUIDING/CONTROLLING DEVICE AND APPLICATION SYSTEM THEREOF

(71) Applicant: Jui-Cheng Chang, Keelung (TW)

(72) Inventor: Jui-Cheng Chang, Keelung (TW)

(73) Assignee: CH Creative Co., Ltd., Taipei (TW)

( * ) Notice: Subject to any disclaimer, the term of this patent is extended or adjusted under 35 U.S.C. 154(b) by 94 days.

(21) Appl. No.: 17/593,881

(22) PCT Filed: Mar. 27, 2019

(86) PCT No.: PCT/CN2019/079861
§ 371 (c)(1),
(2) Date: Sep. 27, 2021

(87) PCT Pub. No.: WO2020/191656
PCT Pub. Date: Oct. 1, 2020

(65) Prior Publication Data
US 2022/0154835 A1    May 19, 2022

(51) Int. Cl.
*F16K 11/08* (2006.01)
*F16K 27/06* (2006.01)
*F16K 11/085* (2006.01)

(52) U.S. Cl.
CPC .......... *F16K 11/085* (2013.01); *F16K 27/065* (2013.01)

(58) Field of Classification Search
CPC ............... F16K 11/085; F16K 27/065
See application file for complete search history.

(56) References Cited

U.S. PATENT DOCUMENTS

| | | | | |
|---|---|---|---|---|
| 8,356,627 B2* | 1/2013 | Hoshi | ............. | G01F 15/005 137/557 |
| 2014/0238073 A1* | 8/2014 | Ohno | ............. | B60H 1/00485 137/625.47 |
| 2015/0345649 A1* | 12/2015 | Semmes | ............. | F16K 11/0856 137/625.23 |
| 2018/0216740 A1* | 8/2018 | Breda | ............. | F16K 11/0856 |
| 2018/0372235 A1* | 12/2018 | Smith | ............. | F16K 11/0853 |
| 2019/0003160 A1* | 1/2019 | Zhu | ............. | F16K 31/60 |
| 2019/0049024 A1* | 2/2019 | Marks | ............. | F16K 11/076 |

* cited by examiner

*Primary Examiner* — Kevin R Barss
(74) *Attorney, Agent, or Firm* — Rosenberg, Klein & Lee

(57) ABSTRACT

A fluid transfer guiding/controlling device and an application system thereof. The guiding/controlling device is composed of a power transfer/distribution unit and a switch member. The power transfer/distribution unit has a first chamber and a second chamber. At least one bypass flow ways are disposed in the first chamber. Stop sections are disposed in the second chamber. Communication notches are disposed in adjacency to the stop sections in communication with an outer side. The switch member having an internal flow guide passage and a first flow guide window and a second flow guide window is disposed in the first and second chambers. The first flow guide window is switchable between the bypass flow ways. The second flow guide window is moved from the stop section to pass through a corresponding communication notch, whereby part of the fluid in the flow guide passage flows through the communication notch.

13 Claims, 13 Drawing Sheets

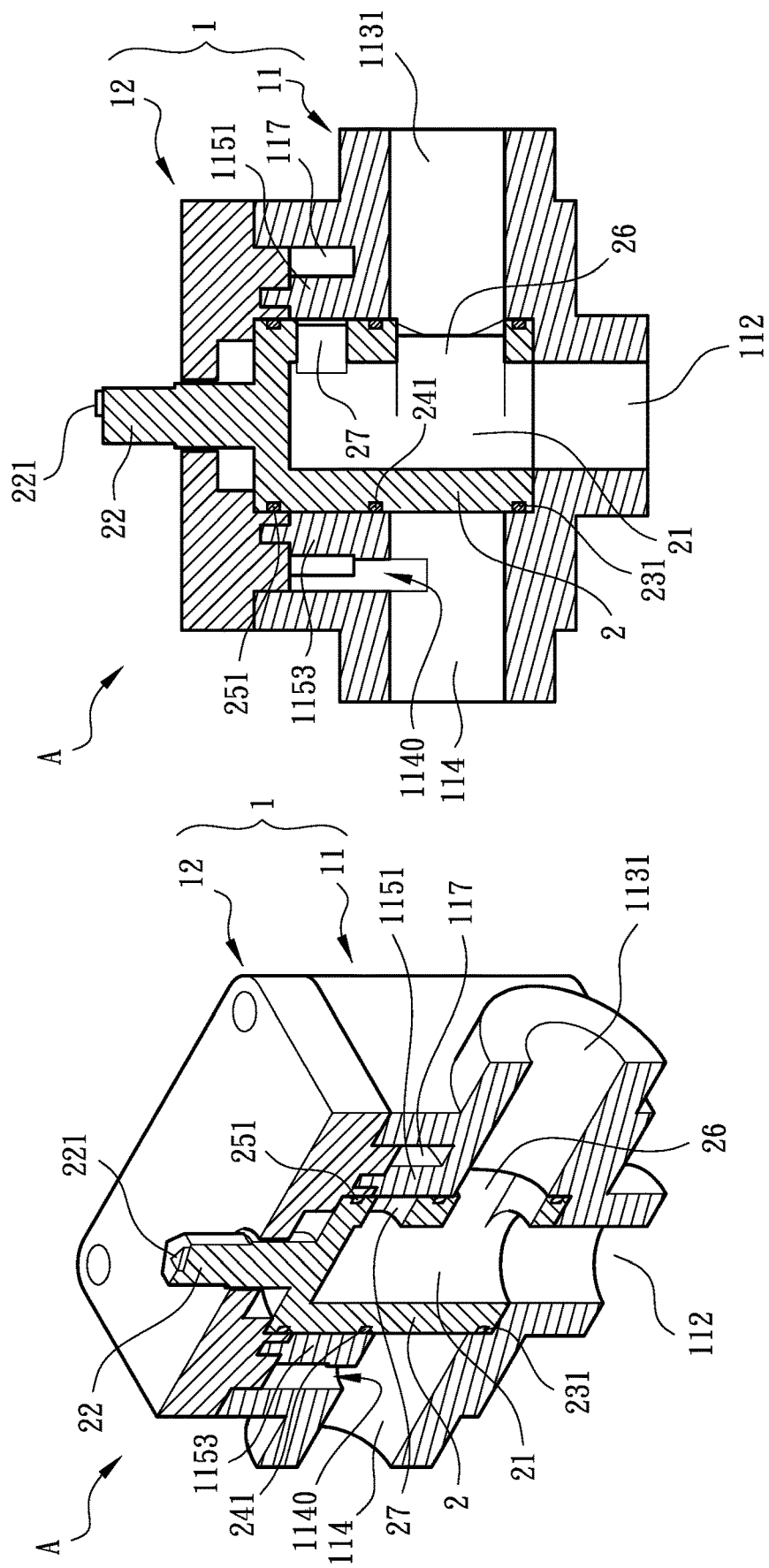

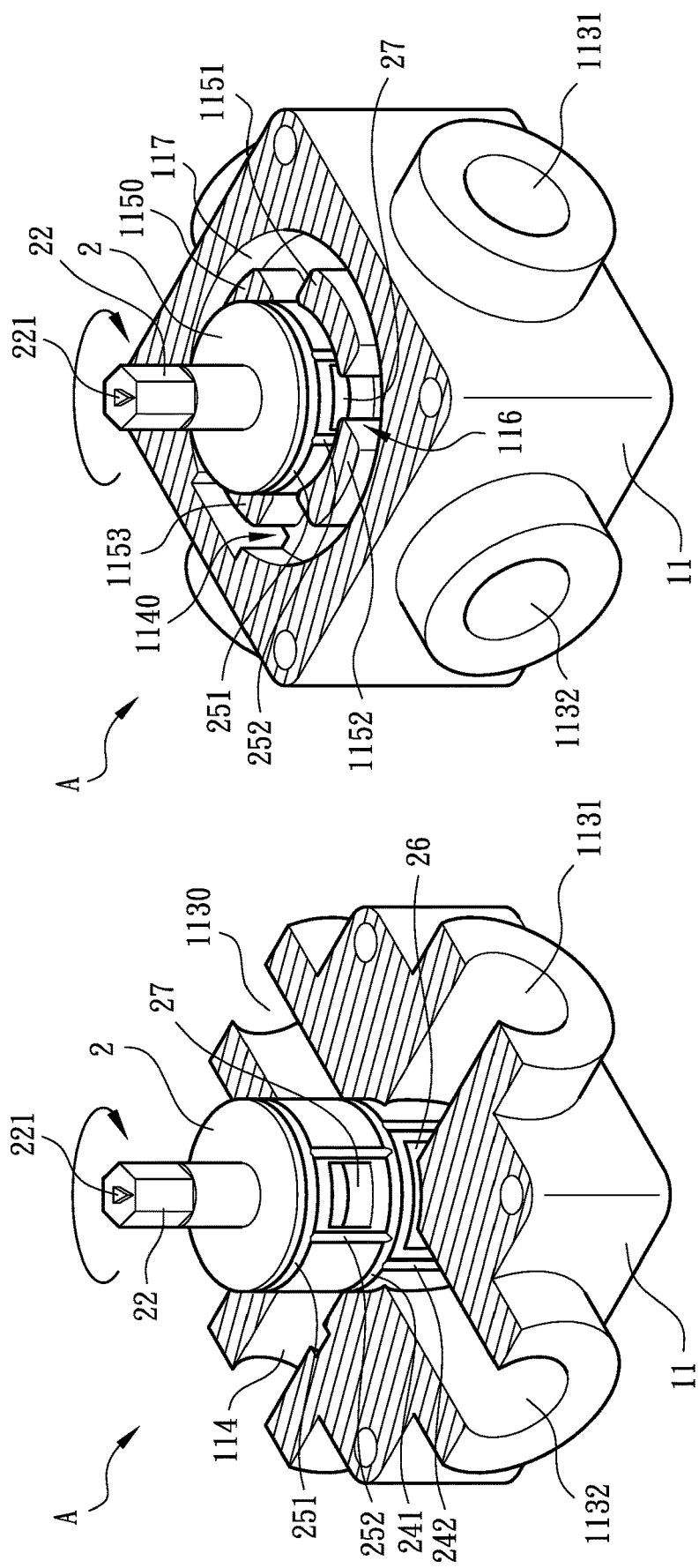

FLUID TRANSFER GUIDING/CONTROLLING DEVICE AND APPLICATION SYSTEM THEREOF

BACKGROUND OF THE INVENTION

1. Field of the Invention

The present invention relates generally to a fluid transfer guiding/controlling device and an application system thereof, and more particularly to a fluid transfer guiding/controlling device and an application system thereof, which in the fluid transfer path switching process, can effectively reduce the phenomenon of abrupt increase/decrease of the pressure due to resistance against the transfer of the fluid. In addition, multiple fluid transfer guiding/controlling devices can be combined to provide wider application range.

2. Description of the Related Art

A conventional fluid transfer direction controlling (switching) valve structure mainly includes a seat body formed with an internal spherical socket or position switching valve seat for receiving a spherical valve core body or displacement valve core. Multiple flow ways are arranged on the circumference of the seat body respectively in communication with the spherical socket or position switching valve seat. At least one perforation is formed in the spherical valve core body or displacement valve core. When the position of the spherical valve core body or displacement valve core is changed, the position of the perforation is also changed to communicate with different flow ways so as to achieve the function of switching between different flow ways to communicate therewith.

Prior art discloses a switching valve structure of a drinking fountain, mainly including a valve seat main body, a switching central shaft and a rotary button member. The valve seat main body has an internal chamber. An assembling section and an exit port are respectively formed through the front and rear sides of the chamber. A water discharging connector is adaptively assembled with the assembling section. The upper and lower ends of the valve seat main body are respectively formed with a water inlet and a first water outlet in communication with the chamber. In addition, a connection section and an assembling section respectively extend from the water inlet and the first water outlet of the outer circumference of the valve seat main body. A rotary locking ring and a water discharge cover body are respectively adaptively assembled with the connection section and the assembling section. The switching central shaft is snugly received in the chamber of the valve seat main body. A first flow way is formed on the outer circumference of the switching central shaft. The first flow way surrounds the switching central shaft by at least 180 degrees. The bottom section of the first flow way is expanded to form a displacement channel corresponding to the first water outlet. The other side of the outer circumference of the switching central shaft is formed with an inward L-shaped second flow way. The second flow way passes through the water discharge end of front side of the switching central shaft to form a second water outlet. Moreover, an assembling section protrudes from the rear end of the switching central shaft, which snugly passes through the exit port of the valve seat main body. The rear end of the assembling section is formed with a noncircular engagement protrusion. A fitting through hole is formed on front side of the rotary button member. The rotary button member is formed with an internal noncircular engagement socket. The engagement protrusion of the switching central shaft is securely assembled and connected with the engagement socket. By means of the above structural design, the shortcoming in application of the switching valve with spherical valve core body is improved.

However, in use of the conventional switching valve structure, when switching between different flow ways, the sectional area of the opening of the fluid passage is gradually reduced. This will lead to abrupt increase of the flowing resistance and pressure in the fluid passage. Therefore, in the case of rapid operation, the pressure in the fluid passage will severely change. This not only affects the smoothness of entire switching process, but also makes the internal components subject to damage due to pressure impact after a long period of operation or even leads to leakage or malfunction of the switching valve structure. Under such circumstance, it is impossible to switch the switching valve structure.

SUMMARY OF THE INVENTION

It is therefore tried by the applicant to provide a fluid transfer guiding/controlling device to solve the above shortcoming of the conventional switching valve structure.

To achieve the above and other objects, the fluid transfer guiding/controlling device of the present invention includes a power transfer/distribution unit and a switch member. The power transfer/distribution unit has a first chamber and a second chamber. At least one bypass flow ways are disposed in the first chamber. The second chamber has multiple stop sections. The stop sections are arranged corresponding to the bypass flow ways. Multiple communication notches are disposed in adjacency to the stop sections. The communication notches are in communication with an outer side of the power transfer/distribution unit. The switch member is formed with an internal flow guide passage disposed in the first and second chambers in communication therewith. The switch member further has a first flow guide window and a second flow guide window respectively in communication with the flow guide passage. The positions of the first and second flow guide windows are synchronously switchable with the switch member, whereby when switching the positions, the first flow guide window is switched between the bypass flow ways to communicate with one of the bypass flow ways, while the second flow guide window is gradually moved from a position corresponding to one of the stop sections to a position where the second flow guide window communicates with an adjacent communication notch so that part of the fluid in the flow guide passage can flow through the second flow guide window and the corresponding communication notch to discharge to outer side of the power transfer/distribution unit.

In the above fluid transfer guiding/controlling device, multiple bypass flow ways are disposed in the first chamber and multiple stop sections are disposed in the second chamber. The stop sections are at least partially arranged corresponding to the bypass flow ways. The communication notches are disposed between the stop sections, whereby when switching the positions, the first flow guide window is switched between the bypass flow ways to communicate with one of the bypass flow ways, while the second flow guide window is gradually moved from one of the stop sections to a position where the second flow guide window communicates with an adjacent communication notch.

In the above fluid transfer guiding/controlling device, a circulation flow way is further disposed in the first chamber in communication with outer side of the power transfer/ distribution unit. The circulation flow way is in communication with the respective communication notches.

In the above fluid transfer guiding/controlling device, the circulation flow way is spaced from the respective bypass flow ways and the first flow guide window is switchable between the circulation flow way and the bypass flow ways to communicate with the circulation flow way or one of the bypass flow ways.

In the above fluid transfer guiding/controlling device, the communication notches are in communication with each other via a circulation passage, the circulation passage being in communication with the circulation flow way via a circulation passageway.

In the above fluid transfer guiding/controlling device, the power transfer/distribution unit is composed of a seat body and a cover body assembled with each other. A central passage is formed at the center of the seat body for receiving the switch member. The bypass flow ways are radially arranged around the central passage. A main flow way is formed at one end of the central passage in communication with the flow guide passage. The stop sections and the communication notches are cooperatively arranged in the second chamber in accordance with the arrangement positions of the bypass flow ways.

In the above fluid transfer guiding/controlling device, a stop annular hub is formed on an inner circumference of one end of the central passage. The main flow way is disposed at the center of the stop annular hub. The cover body is sealedly capped on one end of the seat body distal from the stop annular hub. A central perforation is formed at the center of the cover body. An axially extending drive shaft rod is disposed at the center of an end face of the switch member. The drive shaft rod passes through the central perforation to outward protrude from the power transfer/ distribution unit. The flow guide passage is formed on one end face of the switch member distal from the cover body to extend into the switch member.

In the above fluid transfer guiding/controlling device, a marking section is disposed on an outward extending end face of the drive shaft rod to indicate the directions of the first and second flow guide windows.

In the above fluid transfer guiding/controlling device, a first annular groove, a second annular groove and a third annular groove are sequentially formed on an outer circumference of the switch member from one end formed with the flow guide passage to the other end. A first ring, a second ring and a third ring are respectively disposed in the first, second and third annular grooves. The first, second and third rings are respectively fastened between the outer circumference of the switch member and the inner wall of the central passage. A section of the switch member from the second annular groove to the first annular groove is defined in the first chamber, while a section of the switch member from the second annular groove to the third annular groove is defined in the second chamber.

In the above fluid transfer guiding/controlling device, two first longitudinal channels are formed on the outer circumference of the switch member on two sides of the first flow guide window in communication with the first and second annular grooves. Two second longitudinal channels are formed on two sides of the second flow guide window in communication with the second and third annular grooves. Two first longitudinal blocking sections are disposed between the first and second rings. Two second longitudinal blocking sections are disposed between the second and third rings. The first and second longitudinal blocking sections are respectively inlaid in the first and second longitudinal channels to provide sealing effect between the surroundings of the first and second flow guide windows and the inner wall of the central passage.

In the above fluid transfer guiding/controlling device, the first, second and third rings and the first and second longitudinal blocking sections are at least partially integrally connected with each other.

In the above fluid transfer guiding/controlling device, the width of the first flow guide window relative to the switch member is larger than the distance between two closest edges of two adjacent bypass flow ways and the width of the stop section relative to the central passage is not smaller than the width of the second flow guide window.

In the above fluid transfer guiding/controlling device, the circumferential length of the first flow guide window relative to the switch member is larger than the circumferential length between two closest edges of two adjacent bypass flow ways and the circumferential length of the stop section relative to the central passage is not smaller than the circumferential length of the second flow guide window.

In the above fluid transfer guiding/controlling device, the radian of the first flow guide window relative to the switch member is larger than the radian between two closest edges of two adjacent bypass flow ways and the radian of the stop section relative to the central passage is not smaller than the radian of the second flow guide window.

In the above fluid transfer guiding/controlling device, the circulation passage is annularly disposed along outer rims of the stop sections.

In the above fluid transfer guiding/controlling device, at least one of the bypass flow ways is blocked.

Still to achieve the above and other objects, the application system of the fluid transfer guiding/controlling device of the present invention includes a driving end device, a driven end device and multiple guiding/controlling devices. The driving and driven end devices respectively have driving and driven fluid output ends for a fluid to flow out and driving and driven fluid input ends for the fluid to flow in. The driving and driven fluid output ends of the driving and driven end devices are respectively connected with at least one driving and driven output control devices. The driving and driven fluid input ends of the driving and driven end devices are respectively connected with at least one driving and driven input control devices.

In the above application system, the driving output control device connected with the driving fluid output end of the driving end device and the driving input control device connected with the driving fluid input end of the driving end device are in communication with each other via a first pipeline therebetween.

In the above application system, the driven output control device connected with the driven fluid output end of the driven end device and the driven input control device connected with the driven fluid input end of the driven end device are in communication with each other via a second pipeline therebetween.

In the above application system, the driving output control device connected with the driving fluid output end of the driving end device and the driven input control device connected with the driven fluid input end of the driven end device are in communication with each other via a fourth pipeline therebetween.

In the above application system, the driving output control device connected with the driving fluid output end of the driving end device and the driven input control device connected with the driven fluid input end of the driven end device are in communication with a load device via the fourth pipeline therebetween. The driving input control device connected with the driving fluid input end of the driving end device and the driven output control device connected with the driven fluid output end of the driven end device are in communication with each other via a fifth pipeline therebetween.

In the above application system, the driving input control device connected with the driving fluid input end of the driving end device and the driven output control device connected with the driven fluid output end of the driven end device are in communication with each other via a fifth pipeline therebetween.

In the above application system, thee driving output control device connected with the driving fluid output end of the driving end device and the driven input control device connected with the driven fluid input end of the driven end device are in communication with each other via a fourth pipeline therebetween. The driving input control device connected with the driving fluid input end of the driving end device and the driven output control device connected with the driven fluid output end of the driven end device are in communication with a load device via a fifth pipeline therebetween.

In the above application system, the driving output control device connected with the driving fluid output end of the driving end device and the driven output control device connected with the driven fluid output end of the driven end device are in communication with each other via a sixth pipeline therebetween.

In the above application system, the driving output control device connected with the driving fluid output end of the driving end device and the driven output control device connected with the driven fluid output end of the driven end device are in communication with a load device via the sixth pipeline therebetween. The driving input control device connected with the driving fluid input end of the driving end device and the driven input control device connected with the driven fluid input end of the driven end device are in communication with each other via a seventh pipeline therebetween.

In the above application system, the driving input control device connected with the driving fluid input end of the driving end device and the driven input control device connected with the driven fluid input end of the driven end device are in communication with each other via a seventh pipeline therebetween.

In the above application system, the driving output control device connected with the driving fluid output end of the driving end device and the driven output control device connected with the driven fluid output end of the driven end device are in communication with each other via a sixth pipeline therebetween. The driving input control device connected with the driving fluid input end of the driving end device and the driven input control device connected with the driven fluid input end of the driven end device are in communication with a load device via the seventh pipeline therebetween.

In the above application system, the respective bypass flow ways of the respective fluid transfer guiding/controlling devices are at least partially blocked and the bypass flow ways are independent from each other.

In the above application system, the circulation flow ways of the respective fluid transfer guiding/controlling devices connected with the driving end device are in communication with each other. The advantages of the present invention are:

1. The first flow guide window of the switch member is switchable between the bypass flow ways and the circulation flow way, the second flow guide window is synchronously gradually rotated to communicate with a corresponding communication notch. Accordingly, part of the fluid in the flow guide passage can flow through the communication notch to discharge outward, the impact due to abrupt increase/decrease of fluid pressure in the flow guide passage and the bypass flow ways can be effectively reduced. Accordingly, the smoothness of the fluid transfer path switching process can be enhanced.
2. The present invention provides the above fluid transfer guiding/controlling device, in which the circulation flow way can directly communicate with a fluid source to form a fluid loop without doing work to outer side.
3. The present invention provides the above fluid transfer guiding/controlling device, in which the communication notches are in communication with the circulation flow way via a circulation passage and a circulation passageway to form a simple self-guiding fluid passage.
4. The present invention provides an application system of the above fluid transfer guiding/controlling device, which includes multiple fluid transfer guiding/controlling devices. The respectively bypass flow ways of the fluid transfer guiding/controlling devices are connected with each other via different pipelines. By means of operating the switch members of the fluid transfer guiding/controlling devices, the first flow guide windows of the fluid transfer guiding/controlling devices can be switched between the bypass flow ways to communicate with the corresponding bypass flow ways. Accordingly, the flowing paths of the fluid between the driving end device and the driven end device or the other additional load devices can be controlled and changed to provide various power transmission functions. Therefore, the fluid transfer guiding/controlling device can be widely applied to various fields.

BRIEF DESCRIPTION OF THE DRAWINGS

The following drawings are only used to illustrate the present invention, not intended to limit the scope thereof, in which.

FIG. 4 is a perspective sectional view of the fluid transfer guiding/controlling device of the present invention;

FIG. 5 is a plane sectional view of the fluid transfer guiding/controlling device of the present invention according to FIG. 4;

FIG. 8 is a perspective sectional view of the fluid transfer guiding/controlling device of the present invention, showing that the first flow guide window is switched between different bypass flow ways;

FIG. 9 is a perspective sectional view of the fluid transfer guiding/controlling device of the present invention according to FIG. 8, showing the position of the second flow guide window;

Figure 1:
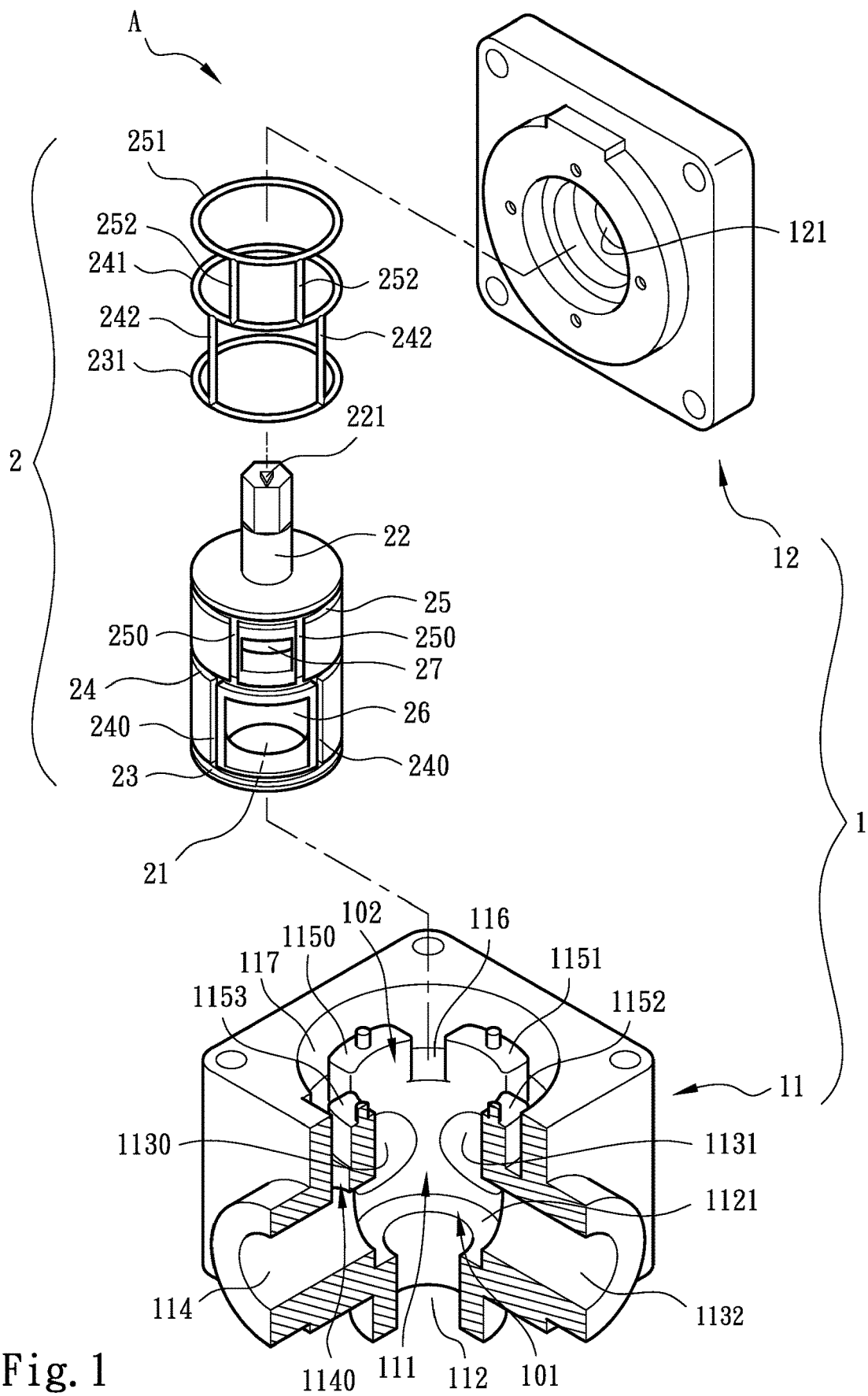
FIG. 1 is a perspective exploded view of the fluid transfer guiding/controlling device of the present invention.

REFERENCE NUMBERS OF THE DRAWINGS power transfer/distribution unit 1
seat body 11
central passage 111
first chamber 101
second chamber 102
main flow way 112
stop annular hub 1121
bypass flow ways 1130, 1131, 1132
circulation flow way 114
circulation passageway 1140
stop sections 1150, 1151, 1152, 1153
communication notches 116
annular circulation passages 117
cover body 12
central perforation 121
switch member 2
guide passage 21
drive shaft rod 22
marking section 221
first annular groove 23
first ring 231
second annular groove 24
first longitudinal channels 240
second ring 241
first longitudinal blocking sections 242
third annular groove 25
second longitudinal channels 250
third ring 251
second longitudinal blocking sections 252
first flow guide window 26
second flow guide window 27
guiding/controlling devices A
driving output control device A1
driving input control device A2
driven output control device A3
driven input control device A4
driving end device C
driving fluid output end C1
driving output pipeline C11
driving fluid input end C2
driving input pipeline C21
driven end device D
driven fluid output end D1
driven output pipeline D11
driven fluid input end D2
driven input pipeline D21
first pipeline E1
second pipeline E2
third pipeline E3
fourth pipeline E4
fifth pipeline E5
sixth pipeline E6
seventh pipeline E7
load device L

DETAILED DESCRIPTION OF THE PREFERRED EMBODIMENTS

The present invention can be best understood through the following description and accompanying drawings.

Figure 2:
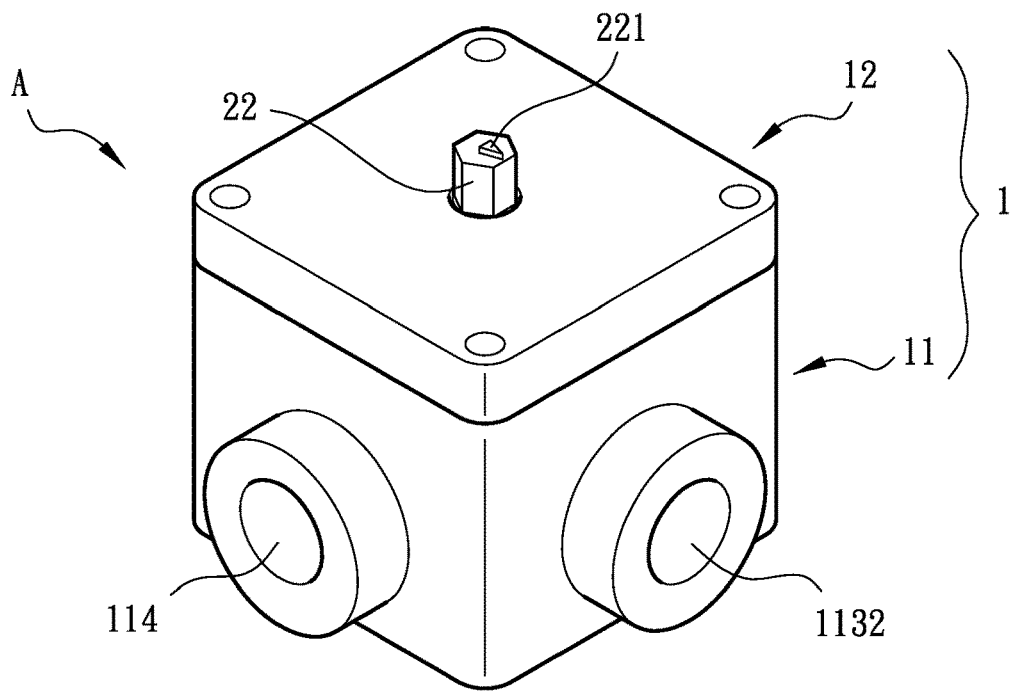
FIG. 2 is a top perspective assembled view of the fluid transfer guiding/controlling device of the present invention.
Figure 3:
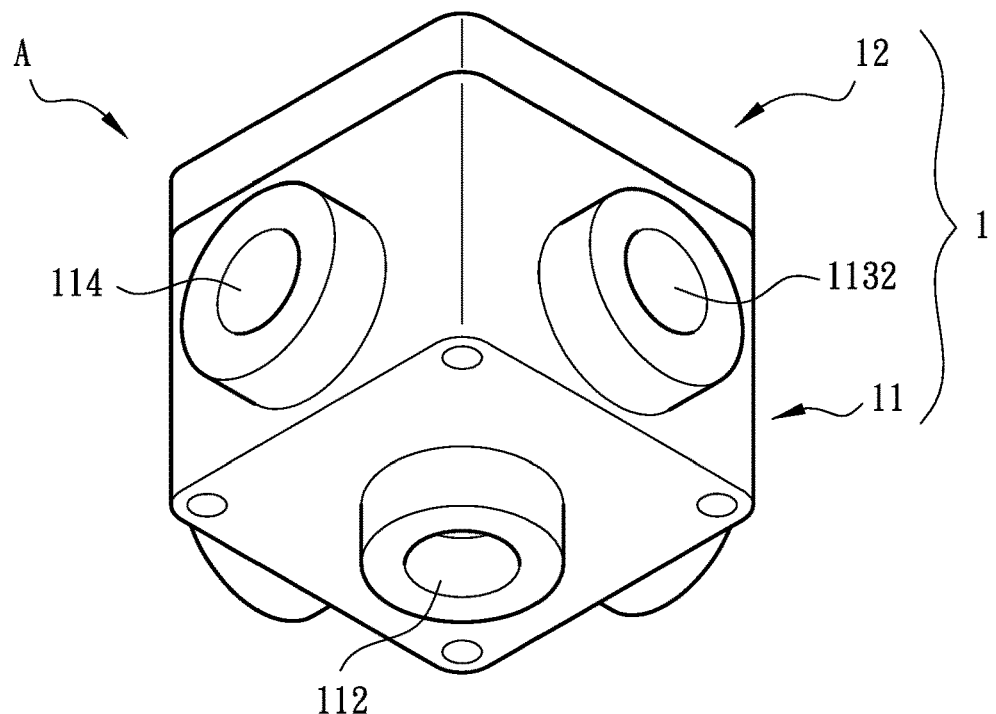
FIG. 3 is a bottom perspective assembled view of the fluid transfer guiding/controlling device of the present invention.

Please refer to FIGS. 1 to 3. The fluid transfer guiding/controlling device A of the present invention includes a power transfer/distribution unit 1 and a switch member 2. The power transfer/distribution unit 1 at least has a first chamber 101 and a second chamber 102. A central passage 111 is formed between the first and second chambers 101, 102 in communication therewith.

In the above embodiment as shown in the drawings, the power transfer/distribution unit 1 is composed of a seat body 11 and a cover body 12 assembled with each other. The central passage 111 is formed at the center of the seat body 11. A stop annular hub 1121 is formed on an inner circumference of one end of the central passage 111 in adjacency to the first chamber 101. The stop annular hub 1121 defines a main flow way 112 for guiding in a fluid. At least one (multiple) bypass flow ways 1130 (1131, 1132) and (or) a circulation flow way 114 are respectively disposed along the circumference of the central passage 111 positioned in the first chamber 101. At least one (multiple) stop sections 1150 (1151, 1152, 1153) are disposed at an end section of the central passage 111 in adjacency to the second chamber 102 respectively corresponding to the bypass flow ways 1130 (1131, 1132) and (or) the circulation flow way 114. Annular circulation passages 117 are disposed along outer rims of the stop sections 1150 (1151, 1152, 1153) in communication with each other. In addition, multiple communication notches 116 are respectively formed between the stop sections 1150 (1151, 1152, 1153) in communication with the circulation passages 117. The circulation flow way 114 and the circulation passage 117 communicate with each other via a circulation passageway 1140.

In the above embodiment as shown in the drawings, the bypass flow ways 1130 (1131, 1132) and (or) the circulation flow way 114 are radially arranged around the central passage 111 at equal circumferential length (radian) intervals. However, in practice, at least one of the bypass flow ways 1130 (1131, 1132) can be a closed structure. Moreover, the number and arrangement form of the bypass flow ways 1130 (1131, 1132) are variable in accordance with different designs to meet the requirements of various situations.

The cover body 12 is sealedly capped on one side of the seat body 11 distal from the main flow way 112. A central perforation 121 is formed at the center of the cover body 12.

An end face of the switch member 2 positioned in the main flow way 112 has an opening. The end face of the switch member 2 is inward recessed to form a flow guide passage 21 in communication with the opening. An axially extending drive shaft rod 22 is disposed at the center of the other end face of the switch member 2 distal from the central perforation 121. A first annular groove 23, a second annular groove 24 and a third annular groove 25 are sequentially formed on the outer circumference of the switch member 2 from one end proximal to the flow guide passage 21 to the other end. A first flow guide window 26 is disposed between the first and second annular grooves 23, 24. A second flow guide window 27 is disposed between the second and third annular grooves 24, 25. The first and second flow guide windows 26, 27 are respectively in communication with the flow guide passage 21. An end face of the drive shaft rod 22 can be provided with a marking section 221 as necessary for indicating the directions of the first and second flow guide windows 26, 27. In addition, two first longitudinal channels 240 are formed on two sides of the first flow guide window 26 in communication with the first and second annular grooves 23, 24. Two second longitudinal channels 250 are formed on two sides of the second flow guide window 27 in communication with the second and third annular grooves 24, 25.

A first ring 231, a second ring 241 and a third ring 251 are respectively disposed in the first, second and third annular grooves 23, 24, 25 on the outer circumference of the switch member 2. Two first longitudinal blocking sections 242 are disposed between the first and second rings 231, 241. Two second longitudinal blocking sections 252 are disposed between the second and third rings 241, 251. The first and second longitudinal blocking sections 242, 252 are respectively inlaid in the first and second longitudinal channels 240, 250 to provide excellent elastic blocking effect between the surroundings of the first and second flow guide windows 26, 27 and the inner wall of the central passage 111. Accordingly, by means of the combination of the first and second rings 231, 241 and the first longitudinal blocking sections 242, a full blocking effect can be achieved between the surrounding of the first flow guide window 26 and the inner wall of the central passage 111. By means of the combination of the second and third rings 241, 251 and the second longitudinal blocking sections 252, a full blocking effect can be achieved between the surrounding of the second flow guide window 27 and the inner wall of the central passage 111.

When assembled, the switch member 2 is disposed in the central passage 111 and the end face of the switch member 2 with the opening of the flow guide passage 21 abuts against the stop annular hub 1121. Cooperatively, the cover body 12 is capped on one side of the seat body 11 distal from the main flow way 112 corresponding to the second chamber 102. The drive shaft rod 22 passes through the central perforation 121 to protrude outward. In this case, the switch member 2 is restricted to move within the power transfer/distribution unit 1.

Under such circumstance, the flow guide passage 21 communicates with the main flow way 112 and the first, second and third rings 231, 241, 251 are respectively fastened between the outer circumference of the switch member 2 and the inner wall of the central passage 111, whereby the central passage 111 is partitioned into two parts. One of the two parts has the at least one (multiple) bypass flow ways 1130 (1131, 1132) and the circulation flow way 114 corresponding to the first chamber 101. The other of the two parts has the at least one (multiple) stop sections 1150 (1151, 1152, 1153), the communication notches 116 and the circulation passages 117. Cooperatively, the first and second longitudinal blocking sections 242, 252 respectively block the gaps between the surroundings of the first and second flow guide windows 26, 27 and the inner wall of the central passage 111 to achieve the aforesaid full blocking effect.

Figure 7:
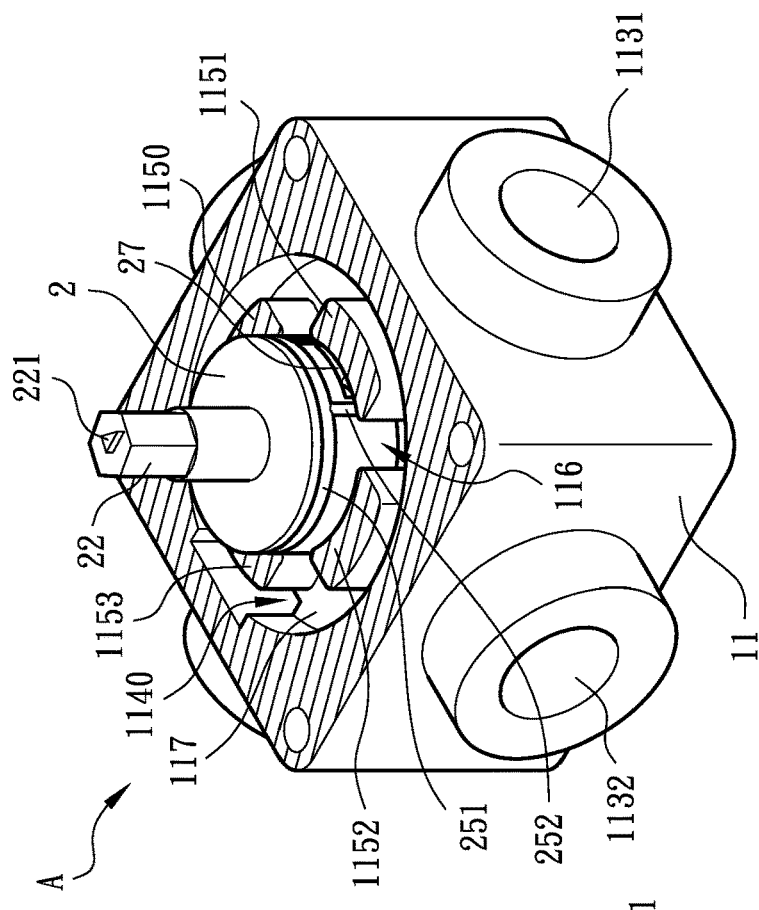
FIG. 7 is a perspective sectional view of the fluid transfer guiding/controlling device of the present invention according to FIG. 5, showing the position of the second flow guide window.
Figure 6:
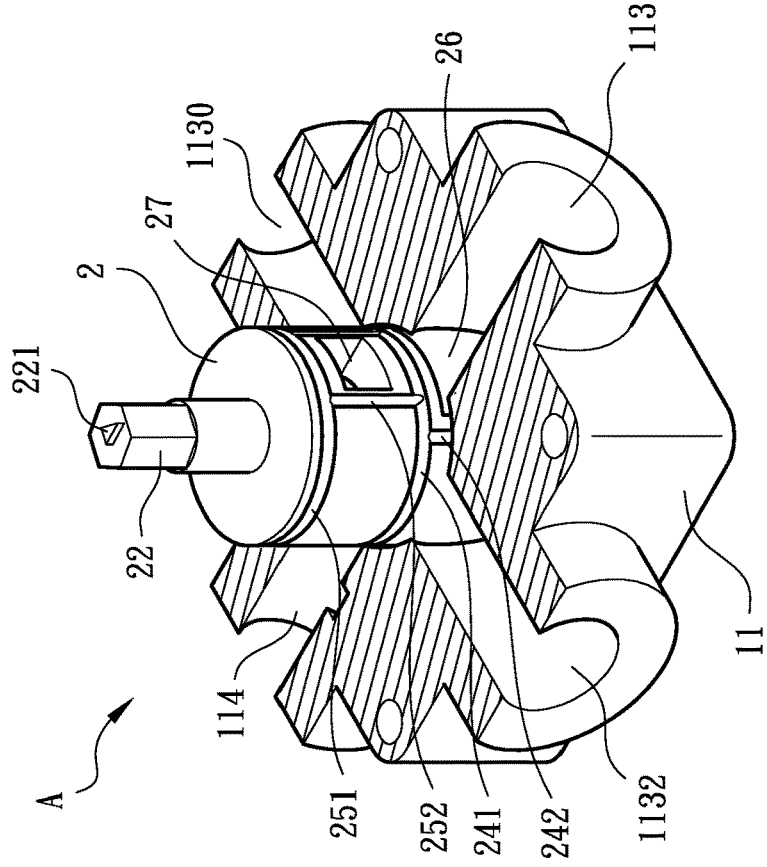
FIG. 6 is a perspective sectional view of the fluid transfer guiding/controlling device of the present invention according to FIG. 5, showing the position of the first flow guide window.

Please now refer to FIGS. 4 and 7, which show an initial state of the guiding/controlling device A of the present invention after assembled. In the initial state, the flow guide passage 21 of the switch member 2 communicates with the main flow way 112 and the first flow guide window 26 can communicate with one of the bypass flow ways 1131, while the second flow guide window 27 is blocked by the stop section 1151 in the same (matching) direction (corresponding direction and angle). At this time, a fluid of an external power supply (with energy) can be guided in from the main flow way 112 (or the bypass flow way 1131 in communication with the first flow guide window 26). The fluid then passes through the flow guide passage 21 to be guided out from the bypass flow way 1131 in communication with the first flow guide window 26 (or the main flow way 112).

Please now refer to FIGS. 8 to 11. In the guiding/controlling device A of the present invention, when the drive shaft rod 22 is driven by an external force to make the switch member 2 start to rotate to another angular position (as shown in FIGS. 8 and 9), the first flow guide window 26 is gradually misaligned from the bypass flow way 1131, which is originally in communication with the first flow guide window 26. In this case, the corresponding sectional area between the bypass flow way 1131 and the first flow guide window 26 for the fluid to pass through is relatively gradually reduced. As a result, due to the gradual reduction of the sectional area of the fluid path, the pressure of the fluid passing through the flow guide passage 21 is gradually increased. At this time, the second flow guide window 27 is synchronously gradually rotated from a state wherein the second flow guide window 27 is totally blocked by the stop section 1151 to a state wherein the second flow guide window communicates with the adjacent communication notch 116. Accordingly, part of the fluid in the flow guide passage 21 can flow through the second flow guide window 27 and the communication notch 116 gradually communicating with the second flow guide window 27 into the circulation passages 117 and then pass through the circulation passageway 1140 and the circulation flow way 114 to discharge outward. Therefore, when using the switch member 2 to change the transfer path of the fluid in the flow guide passage 21 and make the fluid flow into different bypass flow ways 1130, 1131, 1132 or the circulation flow way 114, under the stop of the inner wall of the central passage 111, part of the fluid in the flow guide passage 21 can be smoothly and fully released. In this case, during the process of change of the transfer path of the fluid, the phenomenon of abrupt increase/decrease of fluid transfer pressure can be effectively relieved so as to enhance the smoothness of the control/transfer of the fluid. Therefore, the possibility of damage of the internal relevant components due to abrupt increase of the fluid pressure is minimized.

Figure 11:
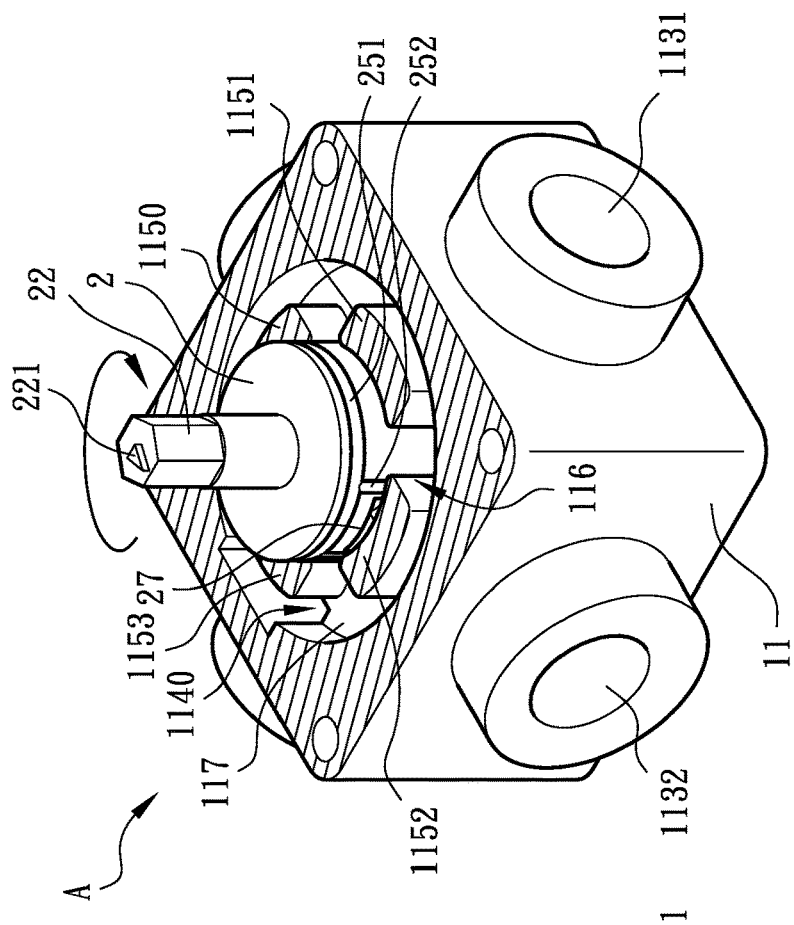
FIG. 11 is a perspective sectional view of the fluid transfer guiding/controlling device of the present invention according to FIG. 10, showing the position of the second flow guide window.
Figure 10:
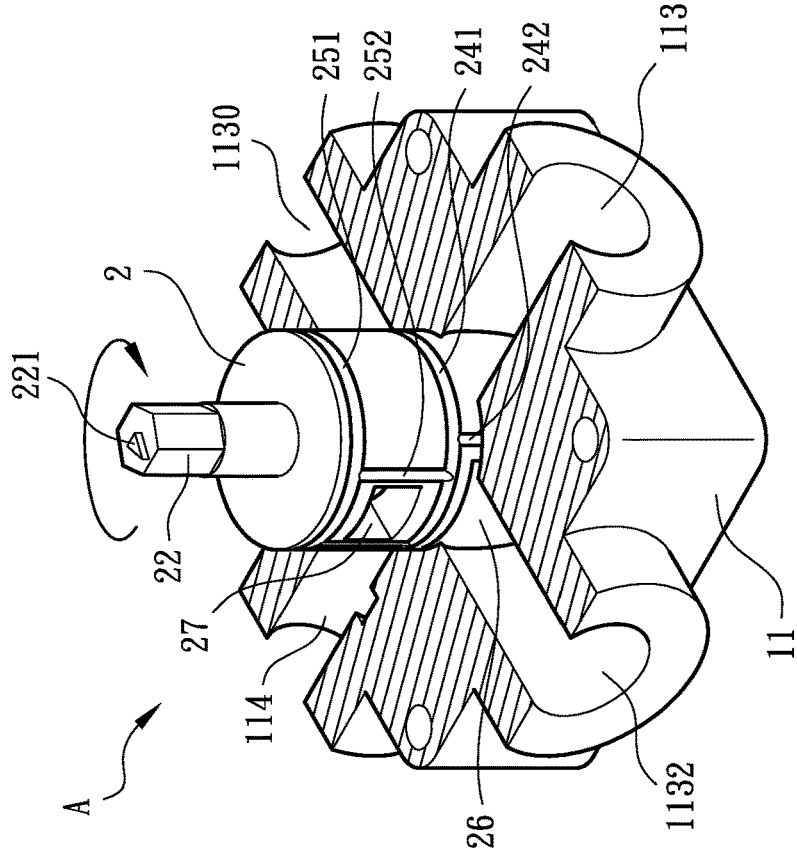
FIG. 10 is a perspective sectional view of the fluid transfer guiding/controlling device of the present invention, showing that the first flow guide window is fully switched from one bypass flow way to another bypass flow way.

After the switch member 2 is further rotated to make the first flow guide window 26 fully in alignment with and in communication with another bypass flow way 1132 (as shown in FIGS. 10 and 11), the second flow guide window 27 is aligned with another stop section 1152 in the same direction (by the same angle) and blocked thereby. At this time, the fluid of the external power supply (with energy) can be guided in from the main flow way 112 (or the bypass flow way 1132. The fluid then passes through the flow guide passage 21 to be guided out from the bypass flow way 1132 (or the main flow way 112). Accordingly, the path of the fluid can be controlled and switched between different bypass flow ways 1132.

Figure 12:
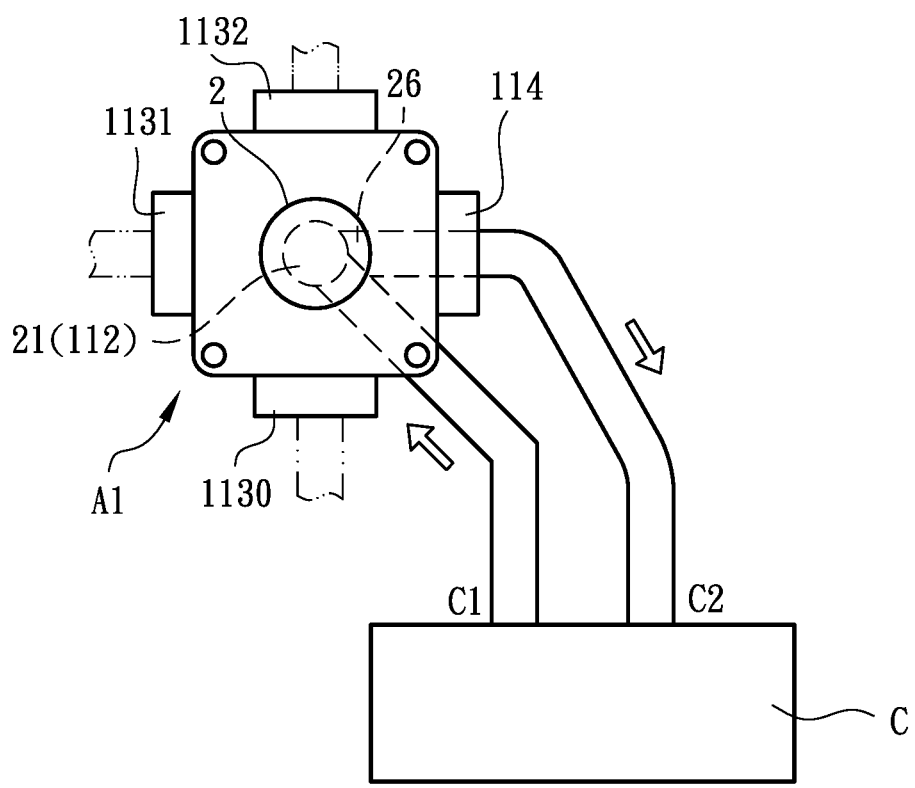
FIG. 12 is a schematic diagram of the fluid transfer guiding/controlling device of the present invention, showing that the first flow guide window is switched to communicate with the circulation flow way.

In a preferred embodiment as shown in FIG. 12, in the case that the switch member 2 is rotated to a position where the first flow guide window 26 is fully aligned with the circulation flow way 114, the fluid of the external power supply (with energy) can be guided in from the main flow way 112 (or the circulation flow way 114). The fluid then passes through the flow guide passage 21 to directly flow from the circulation flow way 114 (or the main flow way 112) back to the external power supply. This fluid path provides a fluid transfer control without outputting power.

In the above embodiments as shown in the drawings, the width (or the corresponding circumferential length or radian) of the first flow guide window 26 is larger than or equal to the interval width (or the corresponding circumferential length or radian) between the respective bypass flow ways 1130 (1131, 1132) and (or) the circulation flow way 114 or the width (or the corresponding circumferential length or radian) of the communication notches 116. In addition, the width (or the corresponding circumferential length or radian) of the first flow guide window 26 is larger than the width (or the corresponding circumferential length or radian) of the second flow guide window 27. Therefore, in the switch operation of the first flow guide window 26 between the bypass flow ways 1130 (1131, 1132) and the circulation flow way 114, the first flow guide window 26 is in a state wherein the first flow guide window 26 is in partial communication with the adjacent bypass flow ways 1130 (1131, 1132) and (or) the circulation flow way 114. Moreover, the width (or the corresponding circumferential length or radian) of the stop section 1150 (1151, 1152, 1153) is not smaller than the width (or the corresponding circumferential length or radian) of the second flow guide window 27. Therefore, when the first flow guide window 26 of the switch member 2 is switched to be aligned with the different bypass flow ways 1130 (1131, 1132) and (or) the circulation flow way 114, power interruption period without power output can be avoided to effectively provide succession smoothness of the switching operation.

Figure 13:
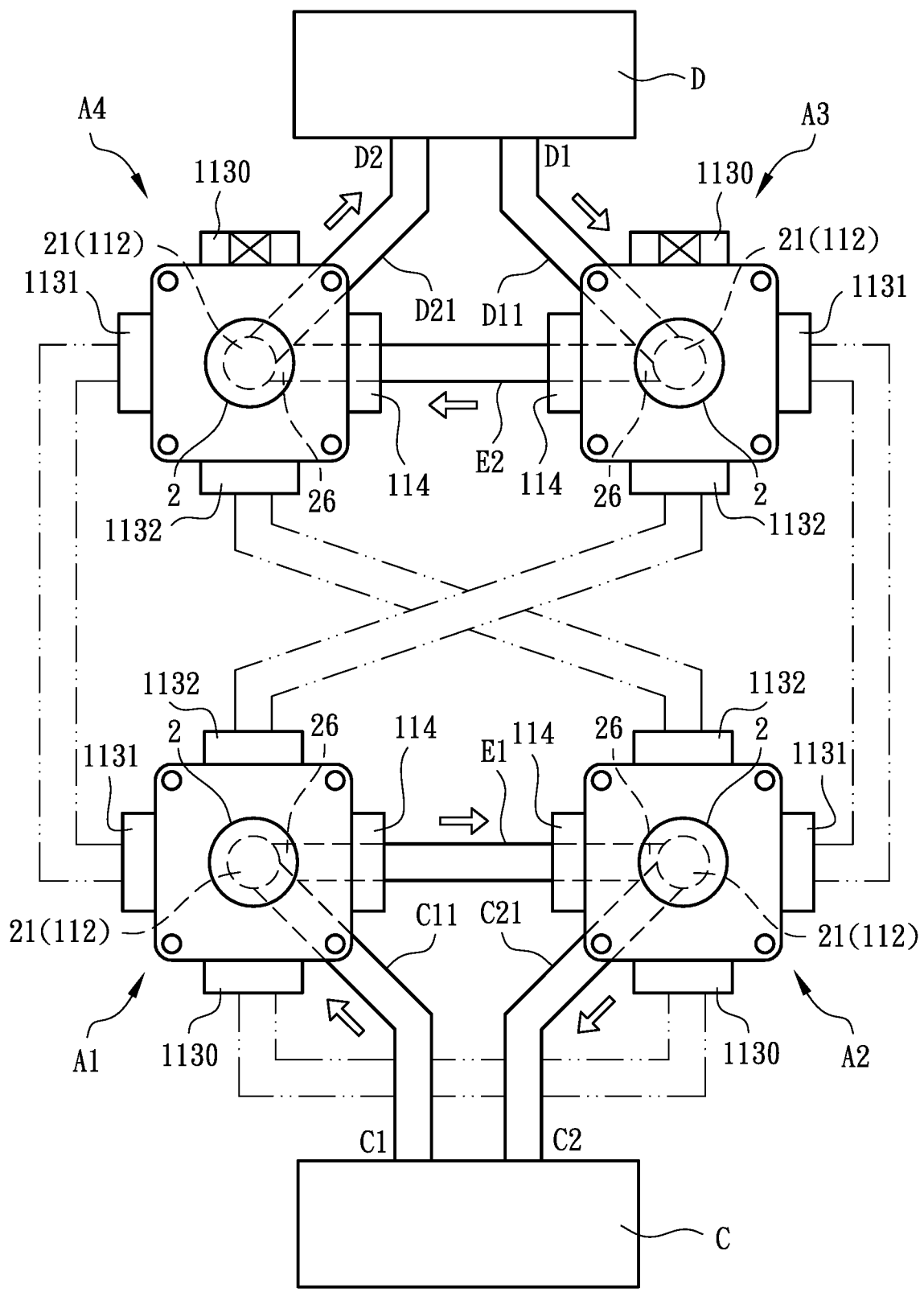
FIG. 13 is a schematic diagram showing a first application state of the fluid transfer guiding/controlling device of the present invention.

Please now refer to FIG. 13. In practical application of the above structure, different numbers of guiding/controlling devices A can be combined to provide wider application. For example, a driving output control device A1 and a driving input control device A2 are assembled with a driving end device C, while a driven output control device A3 and a driven input control device A4 are assembled with a driven end device D. The driving and driven end devices C and D respectively have a driving fluid output end C1 and a driven fluid output end D1 and a driving fluid input end C2 and a driven fluid input end D2. The driving output control device A1 is in communication with the driving fluid output end C1 via the main flow way 112 and a driving output pipeline C11. The driving input control device A2 is in communication with the driving fluid input end C2 via the main flow way 112 and a driving input pipeline C21. The driven output control device A3 is in communication with the driven fluid output end D1 via the main flow way 112 and a driven output pipeline D11. The driven input control device A4 is in communication with the driven fluid input end D2 via the main flow way 112 and a driven input pipeline D21. The above components are assembled to form a basic structure of various applications, which will be described hereinafter.

FIG. 13 shows a first application embodiment of the present invention on the basis of the above basic structure. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The respective circulation flow ways 114 of the driving output and input control devices A1, A2 are in communication with each other via a first pipeline E1 therebetween. The respective circulation flow ways 114 of the driven output and input control devices A3, A4 are in communication with each other via a second pipeline E2 therebetween.

In operation, when the switch members 2 of the driving output and input control devices A1, A2 are respectively such rotated that the first flow guide windows 26 are respectively in communication with the circulation flow ways 114, while the switch members 2 of the driven output and input control devices A3, A4 are respectively such rotated that the first flow guide windows 26 are respectively in communication with the circulation flow ways 114, the fluid flowing out from the driving end device C can flow out from the driving fluid output end C1 and pass through the driving output pipeline C11 and the driving output control device A1 and then pass through the first pipeline E1 to flow to the driving input control device A2. Finally, the fluid passes through the driving input pipeline C21 and the driving fluid input end C2 to flow back to the driving end device C. The fluid flowing out from the driven end device D can flow out from the driven fluid output end D1 and pass through the driven output pipeline D11 and the driven output control device A3 and then pass through the second pipeline E2 to flow to the driven input control device A4. Finally, the fluid passes through the driven input pipeline D21 and the driven fluid input end D2 to flow back to the driven end device D.

In such assembly form, the driving output and input control devices A1, A2 are in direct communication with the driving fluid output end C1 and the driving fluid input end C2. Therefore, the fluid flowing out from the driving fluid output end C1 of the driving end device C can directly pass through the driving output and input control devices A1, A2 to flow from the driving fluid input end C2 back to the driving end device C. Also, the fluid flowing out from the driven fluid output end D1 of the driven end device D can directly pass through the driven output and input control devices A3, A4 to flow from the driven fluid input end D2 back to the driven end device D. Accordingly, a fluid circulation without doing work to outer side is achieved. In the case that the driving end device C is deemed as a mechanism capable of outputting power, (such as a vehicle engine), while the driven end device D is deemed as a mechanism receiving the power, (such as a transmission system), the entire control function is similar to a neutral (N) gear state (of a vehicle transmission case).

Figure 14:
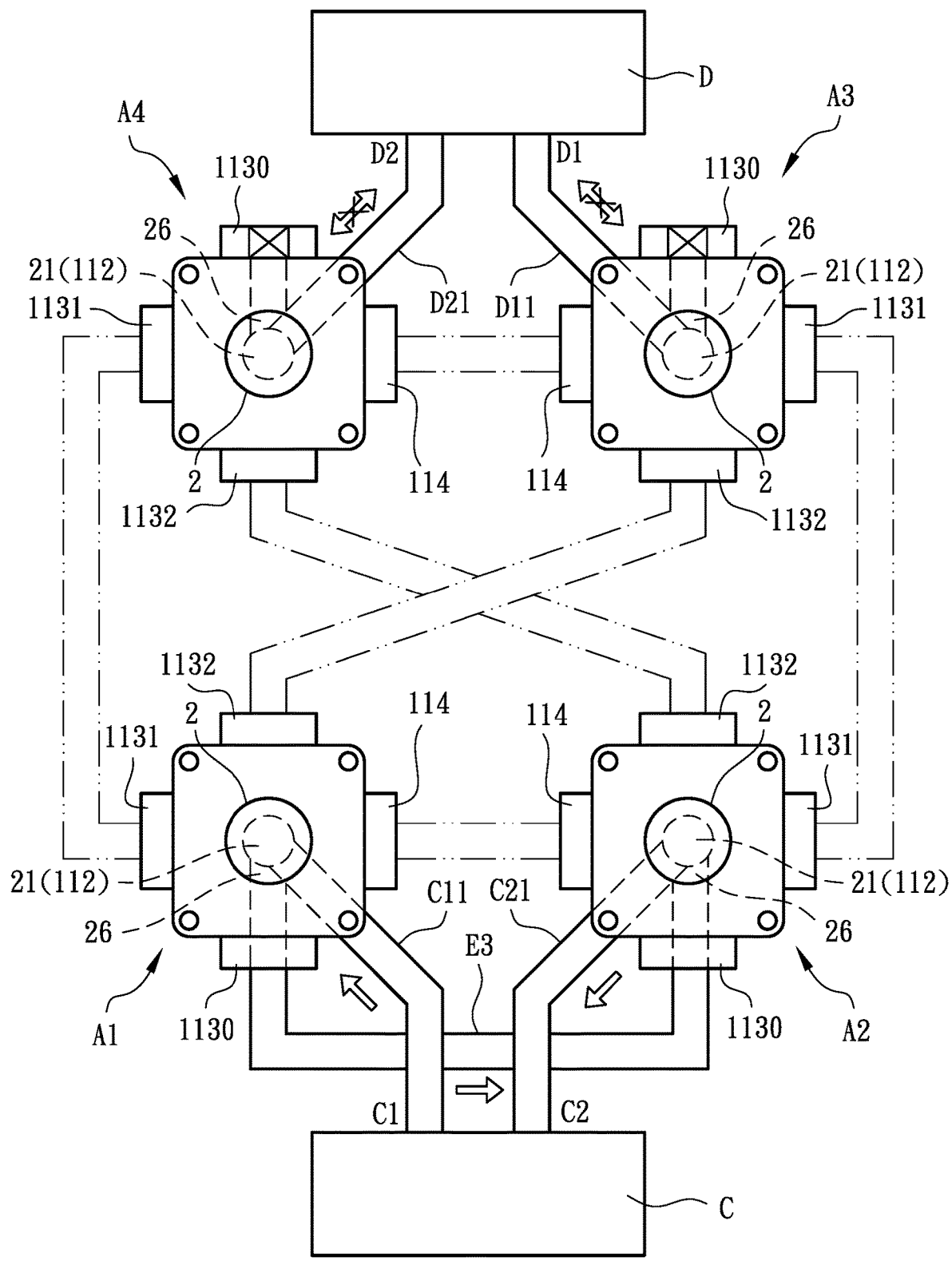
FIG. 14 is a schematic diagram showing a second application state of the fluid transfer guiding/controlling device of the present invention.

Please now refer to FIG. 14, which shows a second application embodiment of the present invention on the basis of the above basic structure. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The bypass flow ways 1130 of the driving output and input control devices A1, A2 are in communication with each other via a third pipeline E3 therebetween. The bypass flow ways 1130 of the driven output and input control devices A3, A4 are blocked.

In operation, when the switch members 2 of the driving output and input control devices A1, A2 are respectively such rotated that the first flow guide windows 26 are respectively in communication with the bypass flow ways 1130 in communication with each other via the third pipeline E3, while the switch members 2 of the driven output and input control devices A3, A4 are respectively such rotated that the first flow guide windows 26 are respectively in communication with the blocked bypass flow ways 1130, the fluid flowing out from the driving end device C can flow from the driving fluid output end C1 through the driving output control device A1 and then pass through the third pipeline E3 to flow to the driving input control device A2. Finally, the fluid passes through the driving fluid input end C2 to flow back to the driving end device C. However, the bypass flow ways 1130 of the driven output and input control devices A3, A4 are blocked so that the first flow guide windows 26 of the driven output and input control devices A3, A4 are blocked, whereby the fluid flowing out from the driven end device D cannot flow out from the driven fluid output end D1. As a result, no fluid passes through the driven fluid input end D2 to flow back to the driven end device D.

In such assembly form, the driven fluid output end D1 and the driven fluid input end D2 connected with the driven output and input control devices A3, A4 are not in communication with each other. Therefore, it is impossible to form a fluid loop. In the case that the driving end device C is deemed as a mechanism capable of outputting power, (such as a vehicle engine), while the driven end device D is deemed as a mechanism receiving the power, (such as a transmission system), the driving end device C is in a fluid circulation neutral (N) gear state without doing work to outer side, while the driven end device D is in a locked state without possibility of operation. The entire control function is similar to a park (P) gear state (of a vehicle transmission case).

Figure 15:
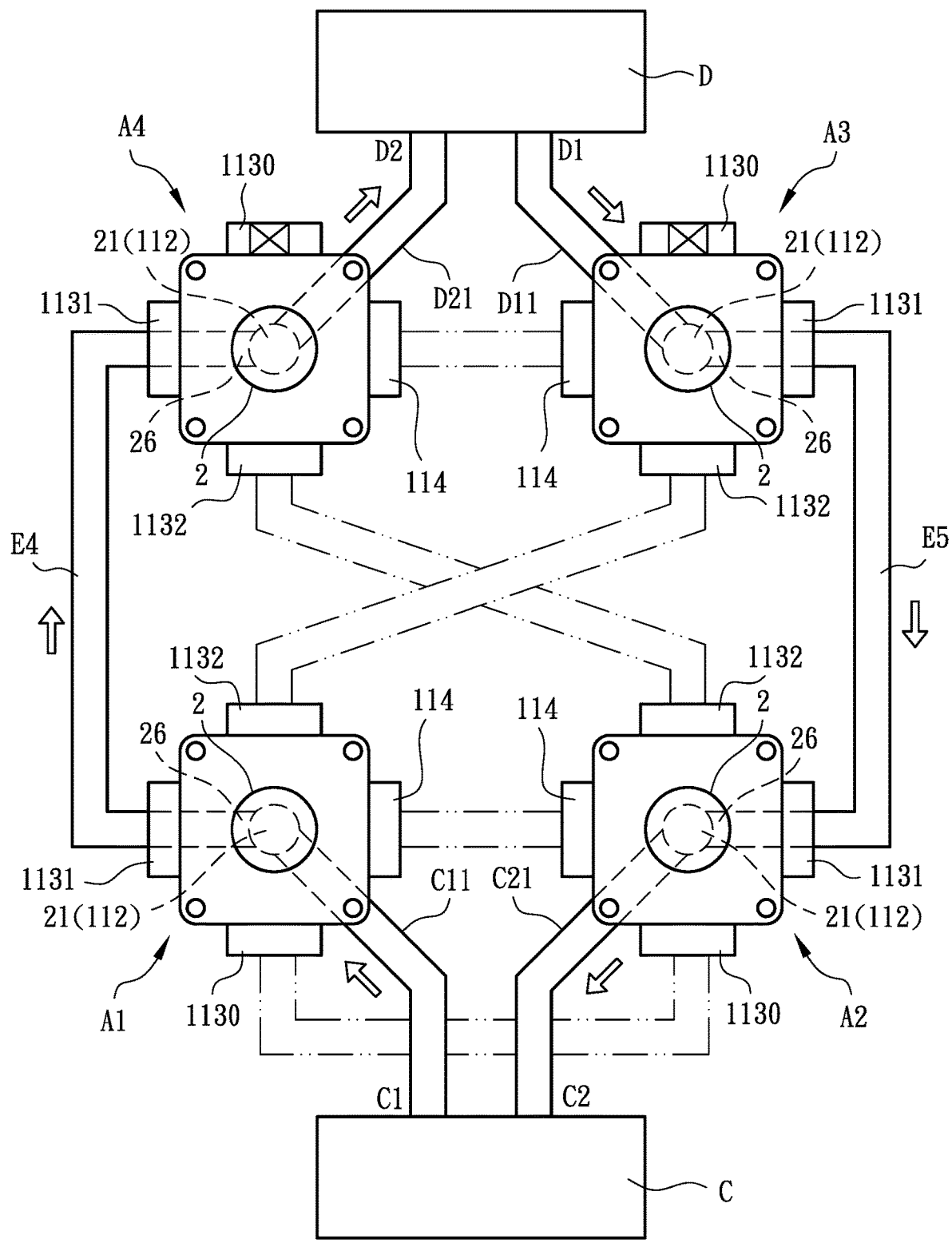
FIG. 15 is a schematic diagram showing a third application state of the fluid transfer guiding/controlling device of the present invention.

Please now refer to FIG. 15, which shows a third application embodiment of the present invention on the basis of the above basic structure. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The bypass flow ways 1131 (or one of the other bypass flow ways 1130, 1132) of the driving output control device A1 and the driven input control device A4 are in communication with each other via a fourth pipeline E4. The bypass flow ways 1131 (or one of the other bypass flow ways 1130, 1132) of the driving input control device A2 and the driven output control device A3 are in communication with each other via a fifth pipeline E5.

In operation, when the switch members 2 of the driving and driven output control devices A1, A3 and the switch members 2 of the driving and driven input control devices A2, A4 are respectively such rotated that the first flow guide windows 26 are respectively in communication with the bypass flow ways 1131 (or one of the other bypass flow ways 1130, 1132) connected with the fourth and fifth pipelines E4, E5, the fluid flowing out from the driving end device C can flow out from the driving fluid output end C1 through the driving output pipeline C11 and the driving output control device A1 and then pass through the fourth pipeline E4 to flow to the driven input control device A4 and further flow through the driven input pipeline D21 and the driven fluid input end D2 to flow to the driven end device D. The fluid flowing out from the driven end device D can flow out from the driven fluid output end D1 through the driven output pipeline D11 and the driven output control device A3 and then pass through the fifth pipeline E5 to flow to the driving input control device A2 and further flow through the driving input pipeline C21 and the driving fluid input end C2 to flow to the driving end device C.

In practical application of such assembly, in the case that the driving end device C is a force application device, (which can be deemed as a mechanism for providing driving force such as a vehicle engine), the driven end device D is a force bearing device, (which can be deemed as a transmission device receiving the power). The driving end device C for applying force and the driven end device D for bearing the force are operated in the same direction. Therefore, the driving end device C for applying force can provide power to drive the driven end device D for bearing the force so as to form a fluid loop capable of doing work. The function is similar to a drive (D) gear state (of a vehicle transmission case).

Figure 16:
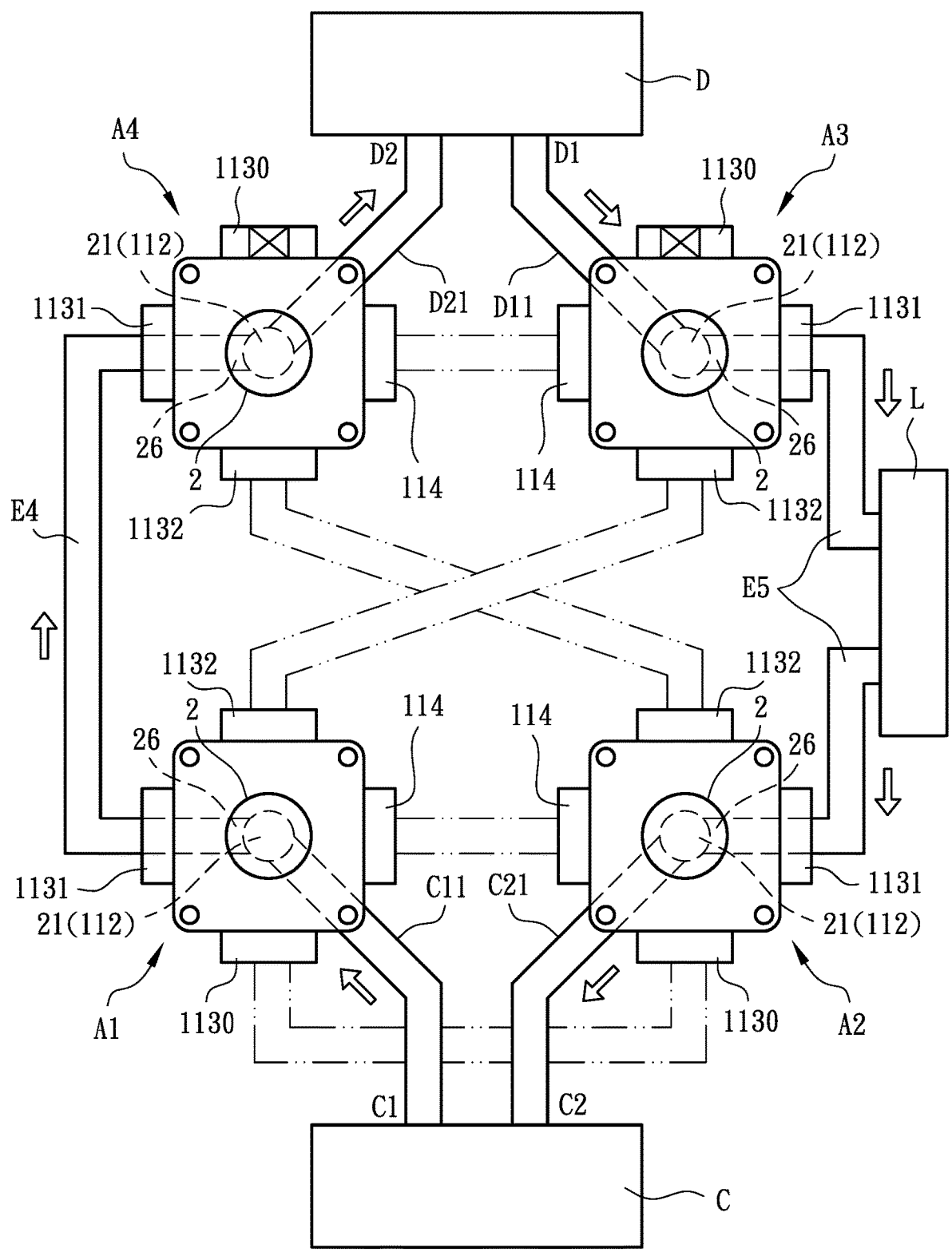
FIG. 16 is a schematic diagram showing a fourth application state of the fluid transfer guiding/controlling device of the present invention.

Please now refer to FIG. 16, which shows a fourth application embodiment of the present invention on the basis of the above basic structure. The fourth application embodiment is similar to the third application embodiment. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The fifth pipeline E5 of the embodiment as shown in FIG. 15 is assembled with a load device L.

In the above assembly, the driving and driven end devices C and D are both force application devices, (in which the driving end device C can be deemed as a mechanism for providing driving force such as a gas engine of a hybrid electric vehicle, while the driven end device D can be deemed as another mechanism for providing driving force such as an electric motor of the hybrid electric vehicle). When the switch members 2 of the driving and driven output control devices A1, A3 and the switch members 2 of the driving and driven input control devices A2, A4 are respectively such rotated that the first flow guide windows 26 are respectively in communication with the bypass flow ways 1131 (or one of the other bypass flow ways 1130, 1132) connected with the fourth and fifth pipelines E4, E5, the driving and driven output control devices A1, A3 and the driving and driven input control devices A2, A4 are integrated to form a loop. In this case, the dynamic energy of the fluid passing through the load device L is the sum of the dynamic energy output from the driving and driven end devices C and D to keep the output of the driving and driven end devices C and D balanced. Accordingly, the driving function via the fifth pipeline E5 and the load device L, (which can be deemed as a forced transmission mechanism) is similar to a state wherein the gas engine and the electric motor of a hybrid electric vehicle output at the same time for driving the transmission mechanism of the vehicle.

According to the same application principle, the load device L can be alternatively disposed on the fourth pipeline E4 in communication with the driving output control device A1 and the driven input control device A4. Similar to the driving function as shown in FIG. 16, the load device L is drivable by the dynamic energy of the fluid of the loop formed by the integrated driving end device C and driven end device D.

Figure 17:
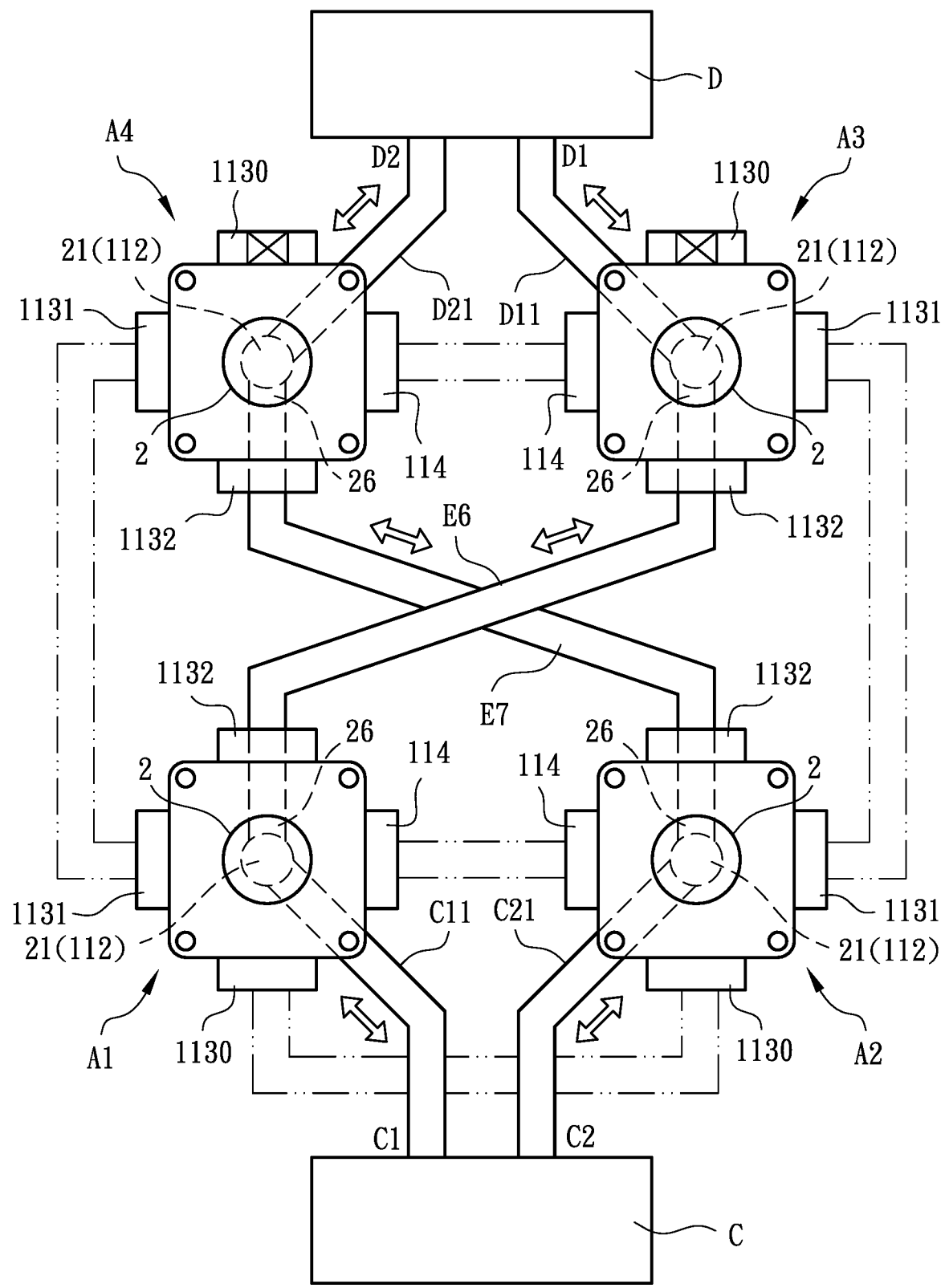
FIG. 17 is a schematic diagram showing a fifth application state of the fluid transfer guiding/controlling device of the present invention.

Please now refer to FIG. 17, which shows a fifth application embodiment of the present invention on the basis of the above basic structure. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The bypass flow ways 1132 (or one of the other bypass flow ways 1130, 1131) of the driving and driven output control devices A1, A3 are in communication with each other via a sixth pipeline E6. The bypass flow ways 1132 (or one of the other bypass flow ways 1130, 1131) of the driving and driven input control devices A2, A4 are in communication with each other via a seventh pipeline E7.

In operation, when the switch members 2 of the driving and driven output control devices A1, A3 and the switch members 2 of the driving and driven input control devices A2, A4 are respectively such rotated that the first flow guide windows 26 are respectively in communication with the bypass flow ways 1132 (or one of the other bypass flow ways 1130, 1131), the fluid flowing out from the driving end device C can flow out from the driving fluid output end C1 through the driving output pipeline C11 and the driving and driven output control devices A1, A3 to the driven fluid output end D1. The fluid flowing out from the driven end device D can flow out from the driven fluid output end D1 through the driven output pipeline D11 and the driven and driving output control devices A3, A1 to the driving fluid output end C1. Therefore, the fluid flowing out from the driving end device C conflicts with the fluid flowing out from the driven end device D.

At this time, in the case that the pressure of the fluid flowing out from the driving end device C is greater than the pressure of the fluid flowing out from the driven end device D, the pressure of the fluid flowing out from the driving end device C is able to overcome the pressure of the fluid flowing out from the driven end device D to make the fluid flow to the driven end device D and then flow back to the driving end device C. On the contrary, in the case that the pressure of the fluid flowing out from the driven end device D is greater than the pressure of the fluid flowing out from the driving end device C, the pressure of the fluid flowing out from the driven end device D is able to overcome the pressure of the fluid flowing out from the driving end device C to make the fluid flow to the driving end device C and then flow back to the driven end device D.

In practical application of such assembly, the driving end device C (or the driven end device D) with greater fluid pressure is a force application device, (which can be deemed as a mechanism for providing forward driving force such as a vehicle engine). The driven end device D (or the driving end device C) with smaller fluid pressure is a force bearing device, (which can be deemed as a transmission device receiving the power). Accordingly, the driving end device C (or the driven end device D) can provide power to overcome the power generated by the driven end device D (or the driving end device C) so as to drive the driven end device D (or the driving end device C) to operate in reverse direction. The function is similar to the reverse (R) gear state (of a vehicle transmission case).

Figure 18:
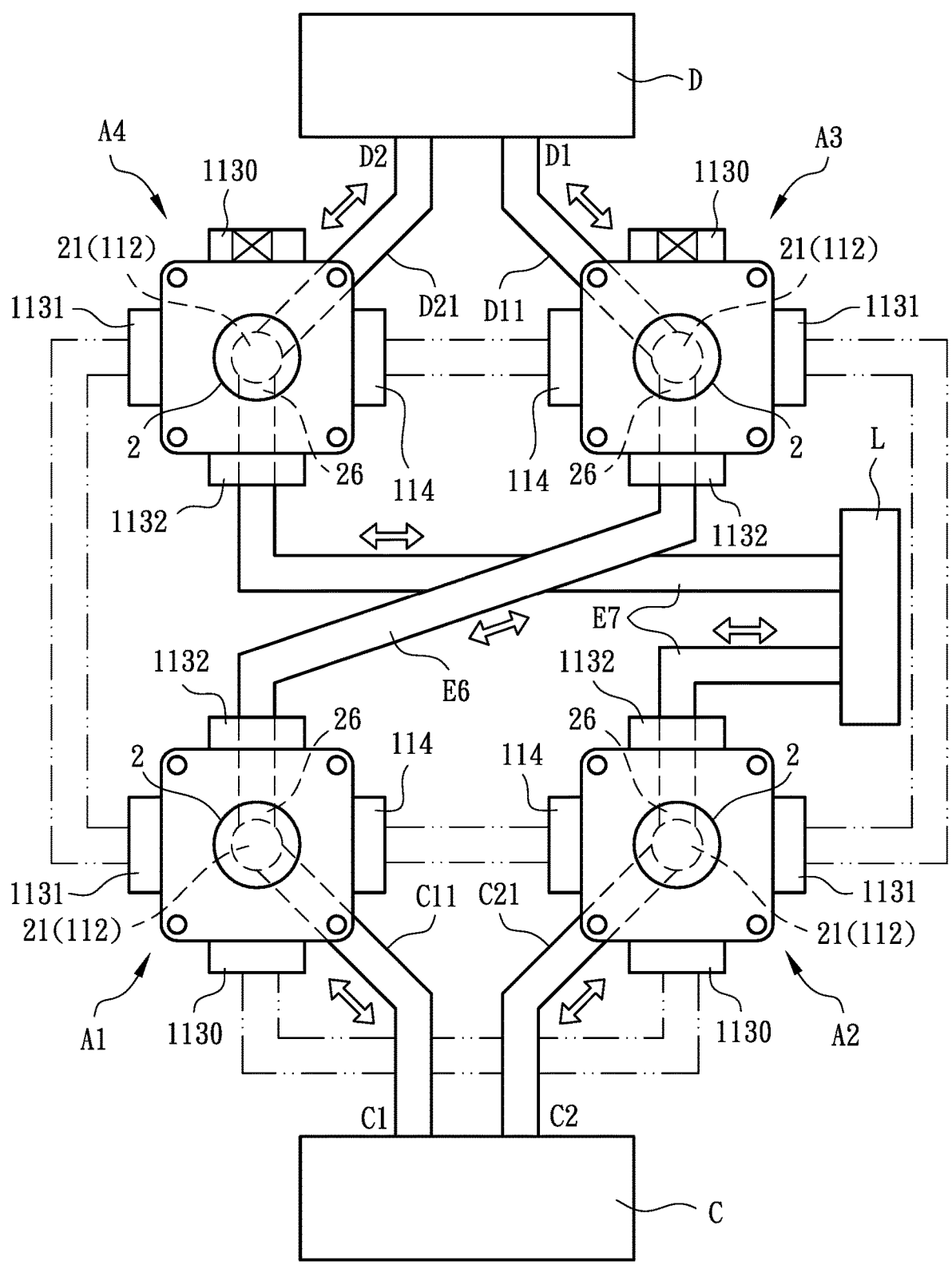
FIG. 18 is a schematic diagram showing a sixth application state of the fluid transfer guiding/controlling device of the present invention.

Please now refer to FIG. 18, which shows a sixth application embodiment of the present invention on the basis of the above basic structure. The sixth application embodiment is similar to the fifth application embodiment. An operator can use the switch members 2 of the respective driving and driven output and input control devices A1, A2, A3, A4 to regulate the corresponding relationships between the first flow guide windows 26 and the bypass flow ways 1130 (1131, 1132) or the circulation flow way 114. The seventh pipeline E7 of the embodiment as shown in FIG. 17 is assembled with a load device L.

In the above assembly, the driving and driven end devices C and D are both force application devices. When the switch members 2 of the driving and driven output control devices A1, A3 and the switch members 2 of the driving and driven input control devices A2, A4 are respectively such rotated that the first flow guide windows 26 are respectively in communication with the bypass flow ways 1132 (or one of the other bypass flow ways 1130, 1131) in communication with the sixth and seventh pipelines E6, E7, the driving and driven output control devices A1, A3 and the driving and driven input control devices A2, A4 are integrated to form a loop. In this case, the fluid flowing through the loop formed by the integrated driving and driven output control devices A1, A3 and the driving and driven input control devices A2, A4 can provide a fluid driving force for the load device L. This fluid driving force is the remainder of the subtraction between the output driving forces of the driving and driven end devices C and D.

In the case that the driving force generated by the driving end device C is greater than the driving force generated by the driven end device D, the driving force generated by the driving end device C is able to overcome the driving force (or static resistance) generated by the driven end device D. On the contrary, in the case that the driving force generated by the driven end device D is greater than the driving force generated by the driving end device C, the driving force provided by the driven end device D can overcome the driving force provided by the driving end device C.

In practical application of such assembly, the driving end device C (or the driven end device D) with greater fluid pressure can be deemed as a mechanism for providing forward driving force (such as a vehicle engine), while the driven end device D (or the driving end device C) with smaller fluid pressure can be deemed as a mechanism for providing backward driving force such as a reducing motor (generator) or a reducing generation device). The load device L is a transmission device (such as a transmission case) receiving the power. Accordingly, the driving end device C (or the driven end device D) can provide power to overcome the backward resistance generated by the driven end device D (or the driving end device C) so as to drive the load device L to continuously operate. The function is similar to the vehicle engine (forward) connected with a reducing motor (generator) to operate (backward resistance) to slow down the speed of the transmission device (the transmission case).

In practical application, the load device L can be alternatively disposed on the sixth pipeline E6 in communication with the driving output control device A1 and the driven output control device A3. Identically, the load device L is drivable by the driving end device C and the driven end device D.

In conclusion, the fluid transfer guiding/controlling device and the application system thereof of the present invention can truly reduce the phenomenon of abrupt increase/decrease of fluid pressure in the switching process.

The fluid transfer guiding/controlling device of the present invention has wide application range and is novel and advanced.

The above embodiments are only used to illustrate the present invention, not intended to limit the scope thereof. Many modifications of the above embodiments can be made without departing from the spirit of the present invention.

What is claimed is:

1. A fluid transfer guiding/controlling device comprising a power transfer/distribution unit and a switch member, the power transfer/distribution unit having a first chamber and a second chamber, bypass flow ways being disposed in the first chamber, stop sections being disposed in the second chamber, the number of the stop sections being equal to the number of the bypass flow ways, the stop sections being respectively positioned corresponding to the bypass flow ways, a communication notch being disposed between each two adjacent stop sections, the communication notches being in communication with an outer side of the power transfer/distribution unit, the switch member being disposed in the power transfer/distribution unit, a circumference of the switch member being formed with a first flow guide window and a second flow guide window, the first flow guide window being positioned within a range of the first chamber, the second flow guide window being positioned within a range of the second chamber, whereby the first flow guide window can be switched between the bypass flow ways to communicate with one of the bypass flow ways and the second flow guide window can be switched between the positions of the stop sections, the switch member having an internal flow guide passage in communication with both the first flow guide window and the second flow guide window, when the switch member is switched between different positions, the first flow guide window and the second flow guide window being synchronously switched between different positions along with the switch member, whereby the first flow guide window becomes non-communicated with the bypass flow way originally in communication therewith to communicate with another bypass flow way, at the same time, the second flow guide window is moved from the stop section corresponding to the original bypass flow way to another stop section corresponding to the other bypass flow way, in the switching process, when the switch member passes through the communication notch between the stop sections, part of the fluid in the flow guide passage flowing through the communication notch to discharge to outer side of the power transfer/distribution unit so as to relieve the impact due to abrupt pressure change in the fluid transfer path switching process.

2. The fluid transfer guiding/controlling device as claimed in claim 1, wherein a circulation flow way is further disposed in the first chamber in communication with the outer side of the power transfer/distribution unit, the circulation flow way being in communication with the respective communication notches of the second chamber, the communication notches are all in communication with a circulation passage, the circulation passage being disposed along outer rims of the stop sections, the circulation passage being in communication with the circulation flow way via a circulation passageway.

3. The fluid transfer guiding/controlling device as claimed in claim 1, wherein the power transfer/distribution unit is composed of a seat body and a cover body assembled with each other, a central passage being formed at a center of the seat body for receiving the switch member, the bypass flow ways being radially arranged around the central passage in the first chamber, a main flow way being formed at one end of the central passage, the mainflow way being in communication with the flow guide passage in the switch member, the cover body being sealedly capped on one end of the seat body, a central perforation being formed at a center of the cover body, an axially extending drive shaft rod being disposed at a center of an end face of the switch member, the drive shaft rod passing through the central perforation to outward protrude from the power transfer/distribution unit.

4. The fluid transfer guiding/controlling device as claimed in claim 3, wherein a first annular groove, a second annular groove and a third annular groove are sequentially formed on an outer circumference of the switch member in a direction from an end face distal from the drive shaft rod to the drive shaft rod, the first flow guide window being positioned between the first annular groove and the second annular groove, the second flow guide window being positioned between the second annular groove and the third annular groove, a first ring, a second ring and the third ring being sequentially disposed in the first annular groove, the second annular groove and the third annular groove, the first ring, the second ring and the third ring being respectively fastened between the switch member and inner wall of the central passage so as to sealedly isolate the first flow guide window and the second flow guide window from each other.

5. The fluid transfer guiding/controlling device as claimed in claim 4, wherein the two first longitudinal channels are formed on the outer circumference of the switch member on two sides of the first flow guide window in connection with the first and second annular grooves, two second longitudinal channels being formed on two sides of the second flow guide window in connection with the second and third annular grooves, two first longitudinal blocking sections being disposed between the first and second rings, two second longitudinal blocking sections being disposed between the second and third rings, the first longitudinal blocking sections being respectively inlaid in the first longitudinal channels, the second longitudinal blocking sections being inlaid in the second longitudinal channels, two ends of the first longitudinal blocking sections being connected with the first ring and the second ring, two ends of the second longitudinal blocking sections being connected with the second ring and the third ring, whereby the longitudinal blocking sections and the rings together form an integrated body so as to achieve better sealing effect between the peripheries of the first flow guide window and the second flow guide window and the inner wall of the central passage.

6. An application system composed of the fluid transfer guiding/controlling devices as claimed in claim 1, comprising a driving end device, a driven end device and multiple guiding/controlling devices, the multiple guiding/controlling devices serving as output and input control devices of the driving end device having a driving fluid output end for a fluid to flow out and a driving fluid input end for a fluid to flow in, the driven end device having a driven fluid output end for a fluid to flow out and a driven fluid input end for a fluid to flow in, the driving fluid output end of the driving end device being connected with at least one driving output control device, the driven fluid output end of the driven end device being connected with at least one driven output control device, the driving fluid input end of the driving end device being connected with at least one driving input control device, the driven fluid input end of the driven end device being connected with at least one driven input control device.

7. The application system as claimed in claim 6, wherein the driving output control device connected with the driving fluid output end of the driving end device and the driving input control device connected with the driving fluid input end of the driving end device are in communication with each other via a first pipeline therebetween, the driven output control device connected with the driven fluid output end of the driven end device and the driven input control device connected with the driven fluid input end of the driven end device are in communication with each other via a second pipeline therebetween.

8. The application system as claimed in claim 6, wherein by means of switching the switch members of the guiding/controlling devices, the driving output control device connected with the driving fluid output end of the driving end device and the driving input control device connected with the driving fluid input end of the driving end device can be in communication with each other via a third pipeline therebetween to form a fluid loop and the fluid loop connected with the driven end device is blocked.

9. The application system as claimed in claim 8, wherein the driving output control device connected with the driving fluid output end of the driving end device and the driven input control device connected with the driven fluid input end of the driving end device are in communication with each other via a fourth pipeline therebetween, the driving input control device connected with the driving fluid input end of the driving end device and the driven output control device connected with the driven fluid output end of the driven end device being in communication with each other via a fifth pipeline therebetween.

10. The application system as claimed in claim 9, wherein at least one of the fourth pipeline and the fifth pipeline is in connection and communication with a load device.

11. The application system as claimed in claim 2, wherein the driving output control device connected with the driving fluid output end of the driving end device and the driven output control device connected with the driven fluid output end of the driving end device are in communication with each other via a sixth pipeline therebetween, the driving input control device connected with the driving fluid input end of the driving end device and the driven input control device connected with the driven fluid input end of the driven end device being in communication with each other via a seventh pipeline therebetween.

12. The application system as claimed in claim 11, wherein at least one of the sixth pipeline and the seventh pipeline is in connection and communication with a load device.

13. The fluid transfer guiding/controlling device as claimed in claim 1, wherein the switch member is a cylindrical body, an arc length of the first flow guide window on the cylindrical body being larger than an arc length of a minimum interval between two adjacent bypass flow ways on the cylindrical body.

\* \* \* \* \*